H. D. OPPENHEIMER.
TANK CLOSURE.
APPLICATION FILED JUNE 17, 1912.

1,079,359.

Patented Nov. 25, 1913.

UNITED STATES PATENT OFFICE.

HARRY D. OPPENHEIMER, OF CHICAGO, ILLINOIS, ASSIGNOR TO S. OPPENHEIMER & CO., A COPARTNERSHIP CONSISTING OF GUSTAV FREUND AND JULIUS OPPENHEIMER, OF CHICAGO, ILLINOIS.

TANK-CLOSURE.

1,079,359.

Specification of Letters Patent. Patented Nov. 25, 1913.

Application filed June 17, 1912. Serial No. 704,065.

*To all whom it may concern:*

Be it known that I, HARRY D. OPPENHEIMER, a citizen of the United States, residing at Chicago, in the county of Cook and State of Illinois, have invented certain new and useful Improvements in Tank-Closures, of which the following is a description.

My invention belongs to that class of devices known as sausage stuffers or the like, and relates particularly to an improved closure for sausage stuffing, or similar machines, having among its objects the production of a device of the kind described that is simple, convenient, efficient, safe and satisfactory, and that may be employed wherever found applicable.

The present invention is in the nature of an improvement on the closure shown in the application of Edward L. Gross, filed August 30, 1911, Serial Number 646,849.

To this end my invention consists in the novel construction, arrangement and combination of parts herein shown and described, and more particularly pointed out in the claim.

Figure 1:
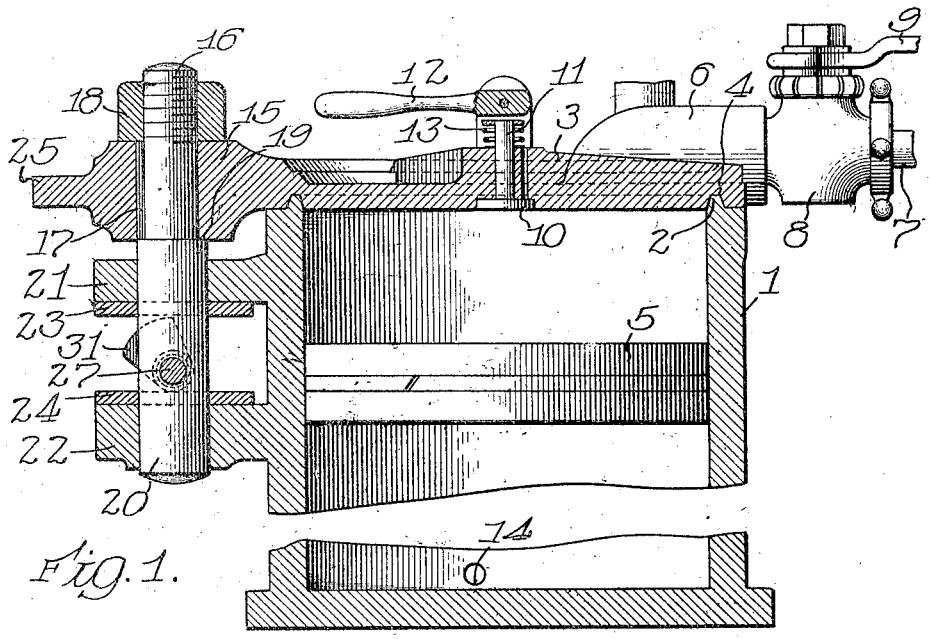
Figure 2:
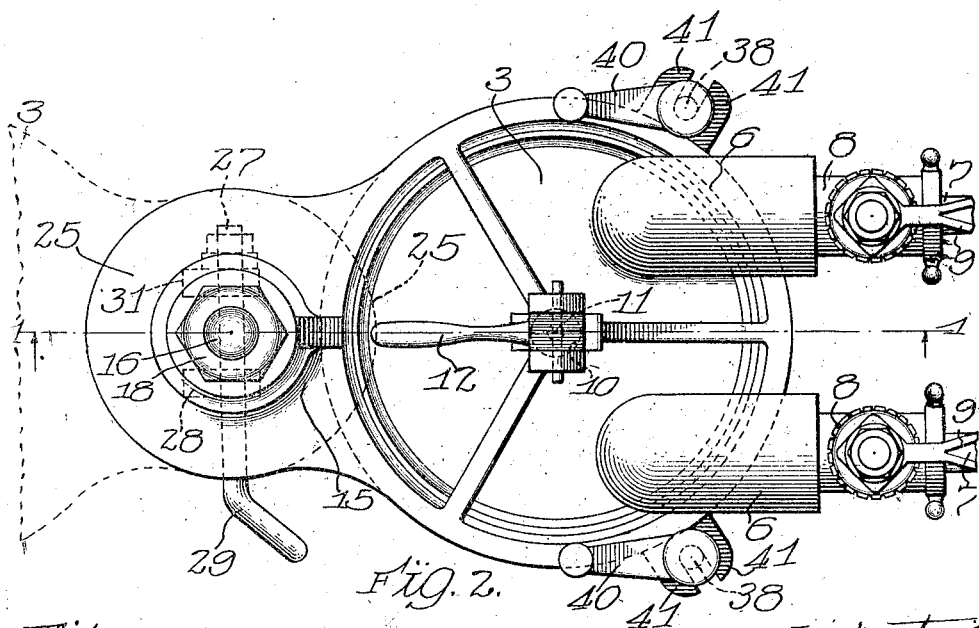

In the drawings, wherein like reference characters indicate like or corresponding parts, Figure 1 is a sectional view taken substantially on line 1, 1 of Fig. 2 of a sausage stuffer, and Fig. 2 is a top plan view of the same.

Referring to the drawings, in which the stuffer receptacle or tank and the closure are shown, 1 represents the body of the stuffer, or that is the tank or receptacle. Within the receptacle is arranged a piston or plunger 5, the same being preferably raised as desired by means of compressed air admitted through the inlet 14. The stuffer tank is perfectly smooth on the inside, so that the plunger or meat follower is positively air tight, water tight and meat tight. The open end of the casing or receptacle is provided with the removable closure or cover 3, the parts being provided with a coöperating bead and recess, affording a tight fit, suitable means being employed for locking the closure in position when desired. As shown, the bead 2 is provided on the end of the receptacle, and the cover 3 provided with the coöperating groove 4. Arranged in the closure are any desired number of discharge outlets, two being shown for the purpose of illustration. Owing to the very convenient construction, however, one or more additional outlets may be provided, if desired.

The two outlets shown consist of tubular extending parts 6, to which are connected the discharge pipes 7, the discharge being controlled by suitable valves arranged in the valve casings 8, which valves are operated by handles 9, or their equivalents. The stuffer head is also provided with an air vent, which is controlled by the valve 10, provided with a stem 11 and handle 12, 13 being a spring for normally maintaining the valve upon its seat.

The closure is pivotally secured to the receptacle and arranged to be first raised and then swung transversely of the receptacle in opening, and swung transversely, and then lowered in closing. The raising and lowering is necessary where the coöperating bead and groove 2 and 4 are employed. The closure is extended as at 15 and secured on a shaft 16 by a key 17 and nut 18, or the equivalent. The shaft 16 is shouldered as at 19, and thence extended as at 20 through two ears 21 and 22, arranged on the side of the receptacle. A pin 27 extends through the shaft, part 20, being extended to form an operating handle or lever 29. The pin or shaft 27 is provided with cams 28 and 31, which coöperate with bearing plates 24 and 23, arranged as shown. As shown in the drawings, the cover is locked in position on one side by the cams bearing against the plate 23. If it is desired to open the receptacle by removing the closure, the handle 29 is grasped and turned so that the cams bear against the plate 24, and consequently lift the shaft 20 and the closure. As soon as the closure is raised sufficiently the shaft 16—20 is rotated by means of the handle or lever 29, swinging the closure from over the receptacle. The closure may be locked in position upon the receptacle in any suitable or desired manner. The cams lock one side, as previously described, and to lock the same at other points, locking bolts 38 extend through or past the ears 41 on the receptacle, and handled nuts 40 may be provided. This is fully described in the application previously mentioned.

The present invention lies particularly in an improved closure, it being understood that the raising and swinging means just described may be modified, if found desirable. As shown, the extending part 15 of the closure 3 is extended as at 25 to form what may be termed an auxiliary closure, so that when the closure is in its open position or in an intermediate position, the extended part 25 will extend over the edge of the receptacle when any portion of the closure 3 does not. This is indicated by the dotted lines in Fig. 2. The extension is intended to prevent the plunger from being thrown out of the receptacle at any time, for instance, should the compressed air be accidentally turned on when the closure 3 is swung away from the top of the receptacle. Since the closure 3, or the auxiliary closure 25, or some part thereof, always overlaps or overlies the receptacle end, the plunger 5 cannot be removed or thrown out without removing the closure from the shaft 16. The auxiliary closure also serves to some extent as a counterbalance for the closure 3, relieving the shaft 16 from strain. Where it is desired to swing the closure 3 in the opposite direction to that shown, the handle 29 is removed and positioned to extend at the opposite side of the device. For this reason I have made the auxiliary closure substantially uniform in diameter. It may, however, be designed to overlie the receptacle only during the normal throw of the closure 3.

Having thus described my invention, it is obvious that various immaterial modifications may be made in the same without departing from the spirit of my invention, hence I do not wish to be understood as limiting myself to the exact form, construction, arrangement or combination of parts herein shown and described, or uses mentioned.

What I claim as new and desire to secure by Letters Patent is:—

An apparatus of the character described comprising a vertically arranged cylindrical receptacle having an inlet adjacent its lower end for compressed air, a follower arranged in air-tight engagement with the inner wall of the receptacle, a closure for the upper end of the receptacle having an outlet opening, said closure being supported from the outside of the cylinder for swinging movement, and the inner surface of the cylinder forming an unobstructed passageway for the follower from top to bottom thereof, and an auxiliary closing medium on the closure adapted to overlie the open upper end of the receptacle as the closure is swung to open position, whereby the said coöperating closures form a stop at all times limiting the outward movement of the follower due to the air pressure therebeneath.

In testimony whereof, I have hereunto signed my name in the presence of two subscribing witnesses.

HARRY D. OPPENHEIMER.

Witnesses:
  ROY W. HILL,
  CHARLES I. COBB.